United States Patent [19]
Mieras et al.

[11] Patent Number: 5,282,268
[45] Date of Patent: Jan. 25, 1994

[54] VIDEO IMAGE STORAGE SYSTEM

[75] Inventors: Herbert J. Mieras, Milwaukee; Duncan C. Wells, Whitefish Bay, both of Wis.

[73] Assignee: Allen-Bradley Company, Inc., Milwaukee, Wis.

[21] Appl. No.: 746,165

[22] Filed: Aug. 14, 1991

Related U.S. Application Data

[63] Continuation of Ser. No. 551,676, Jul. 11, 1990, abandoned, which is a continuation of Ser. No. 249,890, Sep. 27, 1988, abandoned.

[51] Int. Cl.$^5$ .................... G06F 12/00; G06K 9/60; H04N 5/907; H04N 7/18
[52] U.S. Cl. ........................ 395/164; 382/8; 358/101; 358/107; 358/903
[58] Field of Search ............... 395/164, 162; 358/101, 358/106, 107, 903; 382/8, 48

[56] References Cited

U.S. PATENT DOCUMENTS

| | | | |
|---|---|---|---|
| 4,400,728 | 8/1983 | Long | 358/107 |
| 4,450,579 | 5/1984 | Nakashima et al. | 382/8 |
| 4,555,801 | 11/1985 | Miyagawa et al. | 382/44 |
| 4,577,344 | 3/1986 | Warren et al. | 382/1 |
| 4,703,439 | 10/1987 | Lotz | 364/521 |
| 4,709,264 | 11/1987 | Tamura et al. | 358/93 |
| 4,760,444 | 7/1988 | Nielson et al. | 358/101 |
| 4,805,019 | 2/1989 | Holliday | 358/107 |
| 4,852,024 | 7/1989 | Kurakake et al. | 364/521 |
| 4,855,830 | 8/1989 | Davis et al. | 358/168 |
| 4,885,784 | 12/1989 | Miyagawa et al. | 382/8 |
| 4,916,640 | 4/1990 | Gasperi et al. | 364/521 |
| 4,924,307 | 5/1990 | Landowski et al. | 358/107 |

*Primary Examiner*—Raymond J. Bayerl
*Attorney, Agent, or Firm*—Quarles & Brady

[57] ABSTRACT

A image processing apparatus receives two video signals representing different video images. Included in the processor are a number of dual ported memories, each capable of storing a field of the video images. A designation is provided as to whether the images contain a single field or two interlaced fields per image and which of the memories is to store each field. The processor is designed so that both video images can be simultaneously received and stored in the memories. Once a predesignated amount of the received video images have been stored, selected portions of the image data can be read from the memories for processing before the entire image has been stored. The two video images also can be received at different times, in which case the processor halts any image processing which is occurring in order to acquire and store a later image. The processing is performed on the pixels of the image that lie within a user defined window. As each window can be a non-rectilinear shape, a rectangular area of interest which encloses the window is defined and the pixels of the area of interest are read from the memory for analysis. As these pixels are being read out, an image mask is employed to select for processing the pixels that are within the window.

18 Claims, 5 Drawing Sheets

VIDEO IMAGE STORAGE SYSTEM

This application is a continuation of application Ser. No. 07/551,676 filed on Jul. 11, 1990, now abandoned, which was a continuation of application Ser. No. 07/249,890 filed on Sep. 27, 1988 now abandoned.

BACKGROUND OF THE INVENTION

The present invention relates to video image processing apparatus and more particularly to the portions of such apparatus for storing and retrieving data representing the video image.

Machine vision systems are being used to analyze products at various points during the manufacturing process. Such a system includes a video camera placed along an assembly line to produce a video image of each product. This video image is then analyzed by an image processor to detect characteristics of the products, such as the presence of components and whether the product's mechanical dimensions are within specified tolerances. Due to the complexity of the image analysis performed, many video image processors are unable to analyze the video image on a real time basis. Therefore, some form of an image storage mechanism must be provided in such processors. Such storage mechanisms usually digitize the image into a two dimensional array of picture elements. One dimension corresponds to the scan lines in the image and the other dimension corresponds to the columns of picture elements.

Heretofore, a video processing system was typically associated with a single camera. As the analysis capabilities improve, it is often desirable to capture two video images of each product as it progresses through the manufacturing process. In this instance each image represents a separate view of the object in order to inspect different features. Although some previous image processors had multiple cameras coupled to them, they could only acquire, store and analyze the image from one camera at a time. As a result, if multiple views of a single object were to be acquired, the views would represent the status of the object at different points in time. This creates the potential that the objects could change their orientation and even their characteristics during the interval between the acquisition of the images. Such changes may have an adverse impact on the inspection process. Furthermore, on a rapidly moving assembly line, great care must be taken to insure that the same object is before each camera when the images are taken. Previously, the only available solution was to employ duplicate processing systems to simultaneously acquire and analyze separate images.

The camera in a typical machine vision system generates a gray scale video image, i.e. an image having a multitude of brightness levels. One class of previous image processors converted the gray scale video image into a binary image having only white and black brightness levels. This conversion simplified the analysis of the image by reducing it to two brightness levels. However, in performing the conversion the entire image was binarized even if only a small area contained objects of interest which were to be analyzed. In such instances, the processing time was prolonged by the conversion of the entire image.

A previously known image processing technique allowed the user to define two dimensional "windows" in the image through which certain features and objects of the image could be seen. These features and objects were of interest to the user and the windows defined the portions of the image which contained the features and objects. The time required for image analysis was decreased by processing only the portions of the image within the windows. Advanced image processors allowed the user to define non-rectangular windows, for example ones which are circular or triangular. Although it was relatively easy to address the stored picture elements in a rectangular window by raster scan addressing, non-rectangular windows required more complex address calculations. In the latter case, each line of picture elements within the window could start and end at different picture element columns. Therefore, the incremental number of addresses from the storage location of the last picture element in one line of the window to the storage location for the first element in the next line is not a fixed number. As a result, processing time has to be utilized in determining the first address in each window line, which slows the processing.

SUMMARY OF THE INVENTION

A video processor receives separate video images from two cameras which preferably are in synchronism. Each video image can be represented by a frame consisting of a single field or two interlaced fields. A converter is provided for digitizing each of the video images into two series of digital picture elements. A means is provided for storing the series of picture elements for a plurality of video fields. This storage means may actually consist of a plurality of separate means each for storing the series of pixels for a single video field. The processor is configured by designating whether the series of pixels for one or both of the fields of an interlaced video image are to be stored. In response to that designation, the signals for the corresponding fields of each of the video images are selectively coupled to the storage means so that the designated fields for a given video image may be stored in the processor.

In order to provide the maximum flexibility for the image processing system, the processor, in one embodiment of the present invention, includes a controller for the storage means which responds to a signal indicating when each of the two images is to be stored. If an indication is received for both video images during the same video field interval, the controller enables the storage simultaneously of the series of pixels for each video image. If the controller receives an indication that a new video image from one of the sources is to be stored while the video image from the other source is being read from the storage means, the controller temporarily halts the processing of the other video image in order that the new image from the first source may be acquired and stored by the processor.

The evaluation of the image is performed on the pixels lying within user defined windows which identify portions of the image containing features to be analyzed. The addressing of the storage means to read out the picture elements for processing is simplified by defining an area of interest for each user defined window. Each area of interest is a rectangular portion of the image which encloses the corresponding window. The stored picture elements of the area of interest are read out of the memory using a conventional raster scan addressing scheme. The address of the first picture element in each line of the area of interest is always a fixed increment from the address of the last picture element in the previous line of the area of interest. A mask of the entire image is stored, which allows the system to distinguish between picture elements in the area of interest which are inside or outside the associated window.

A general object of the present invention is to provide an apparatus for an image processor which can simultaneously acquire and store two separate video images for analysis.

A more specific object is to provide a storage mechanism for an image processor in which one or both of the interlaced fields for a given video image frame may be selectively stored in the processor.

Another object of the present invention is to provide a mechanism for arbitrating between the retrieval of image data from one source and the storage of a new image from another source.

A further object is to provide a mechanism which enables data for a portion of a video image to be read from a storage means for processing before the entire image has been stored. By employing this mechanism, the time required for image acquisition and processing is reduced.

Yet another object is to provide an apparatus which performs the processing and analysis on only predefined portions in the image. By processing only these portions, the time required for image analysis is minimized.

An object of the present invention to allow the predefined image portion to have non-rectangular shape as selected by the user and then define a rectangular area enclosing portion. The rectangular area simplifies accessing the image portion.

DESCRIPTION OF THE PREFERRED EMBODIMENT

Figure 1:
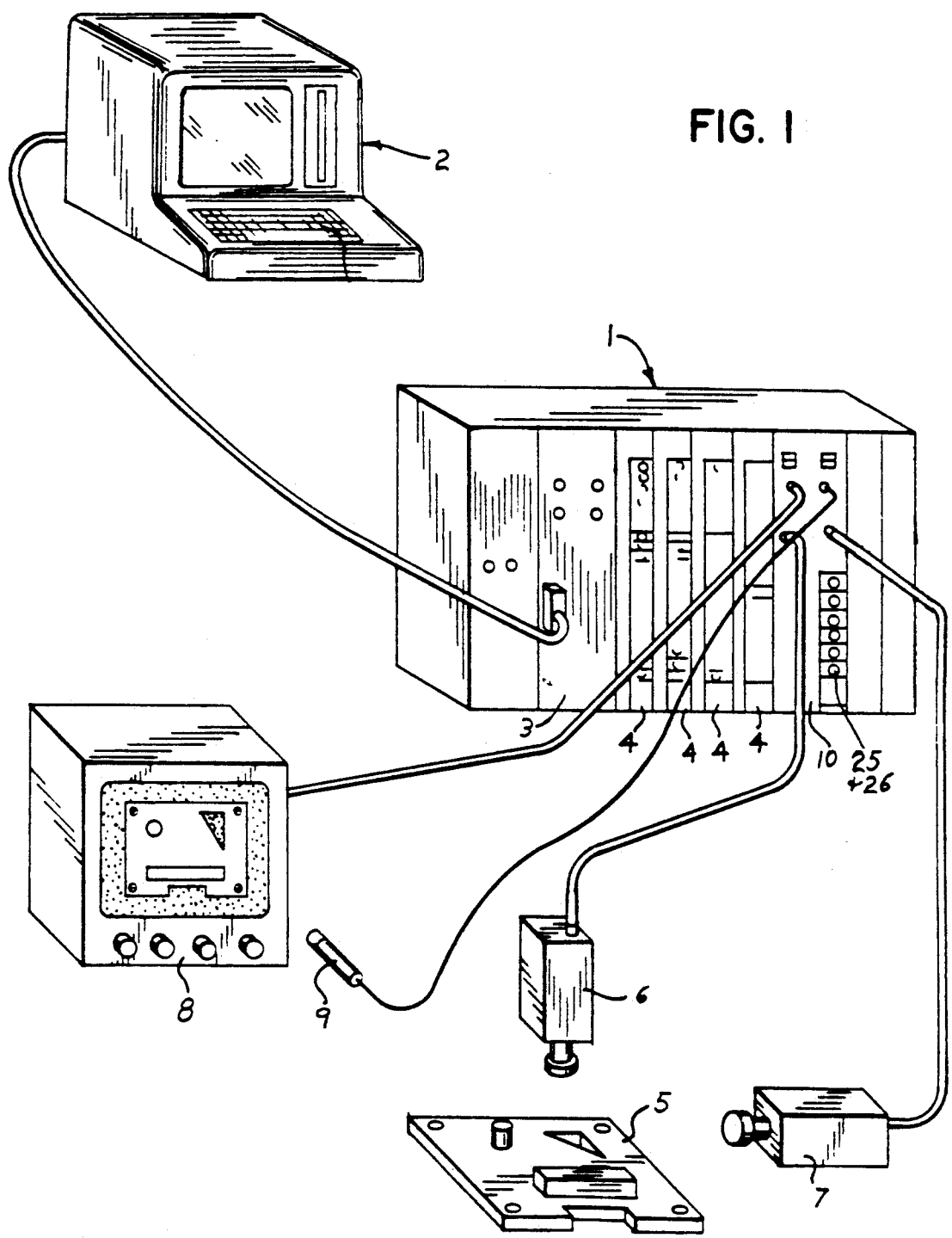
FIG. 1 is a pictorial representation of a programmable controller system which incorporates a vision module utilizing the present invention.

With initial reference to FIG. 1, the present invention is shown incorporated in a programmable controller 1. The programmable controller includes a rack in which different functional modules are housed. The modules comprise a processor 3 which executes a user written program for operating a machine controlled by the controller, a series of conventional input/output modules 4 which interface the controller to the machine, and a novel video image processor 10. The image processor 10 receives video signals from two charge coupled device (CCD) cameras 6 and 7 which are illustrated aimed at a workpiece 5 from different angles. The two video cameras 6 and 7 are conventional raster scan devices that conform to the RS-170 standard and produce a video image frame consisting of two interlaced fields. Each field consists of approximately 256 scan lines. A video monitor 8 displays a video output image from the image processor 10. In addition to displaying the processed image, the monitor 8 and a light pen 9 are used by the operator to configure the image processor via icons and menus displayed on the monitor screen. A computer terminal 2 is coupled to the main processor module 3 to program it.

Image Processor Hardware

Figure 2:
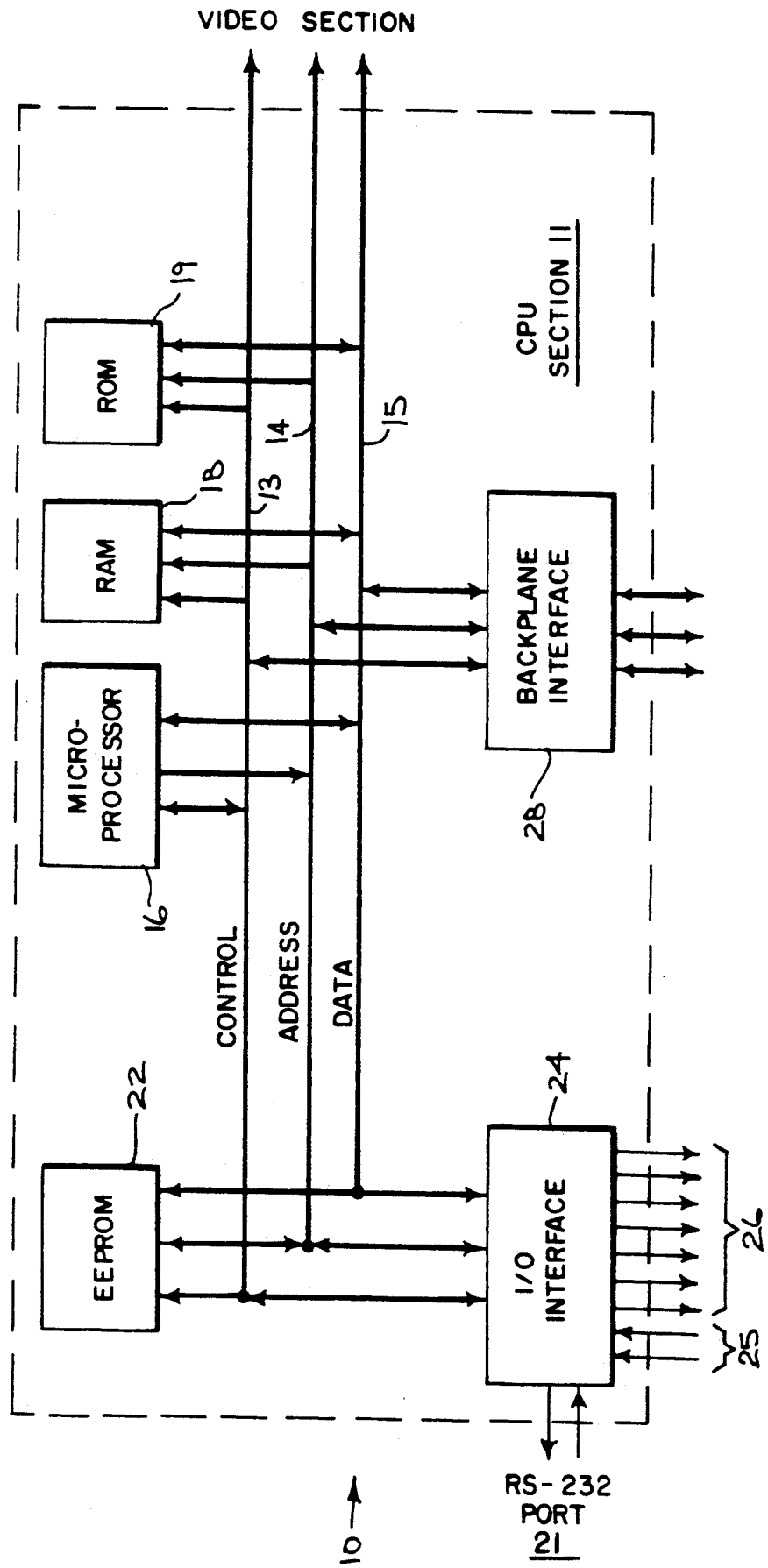
FIG. 2 represents a block diagram of the central processing unit section of a video image processor according to the present invention.
Figure 3:
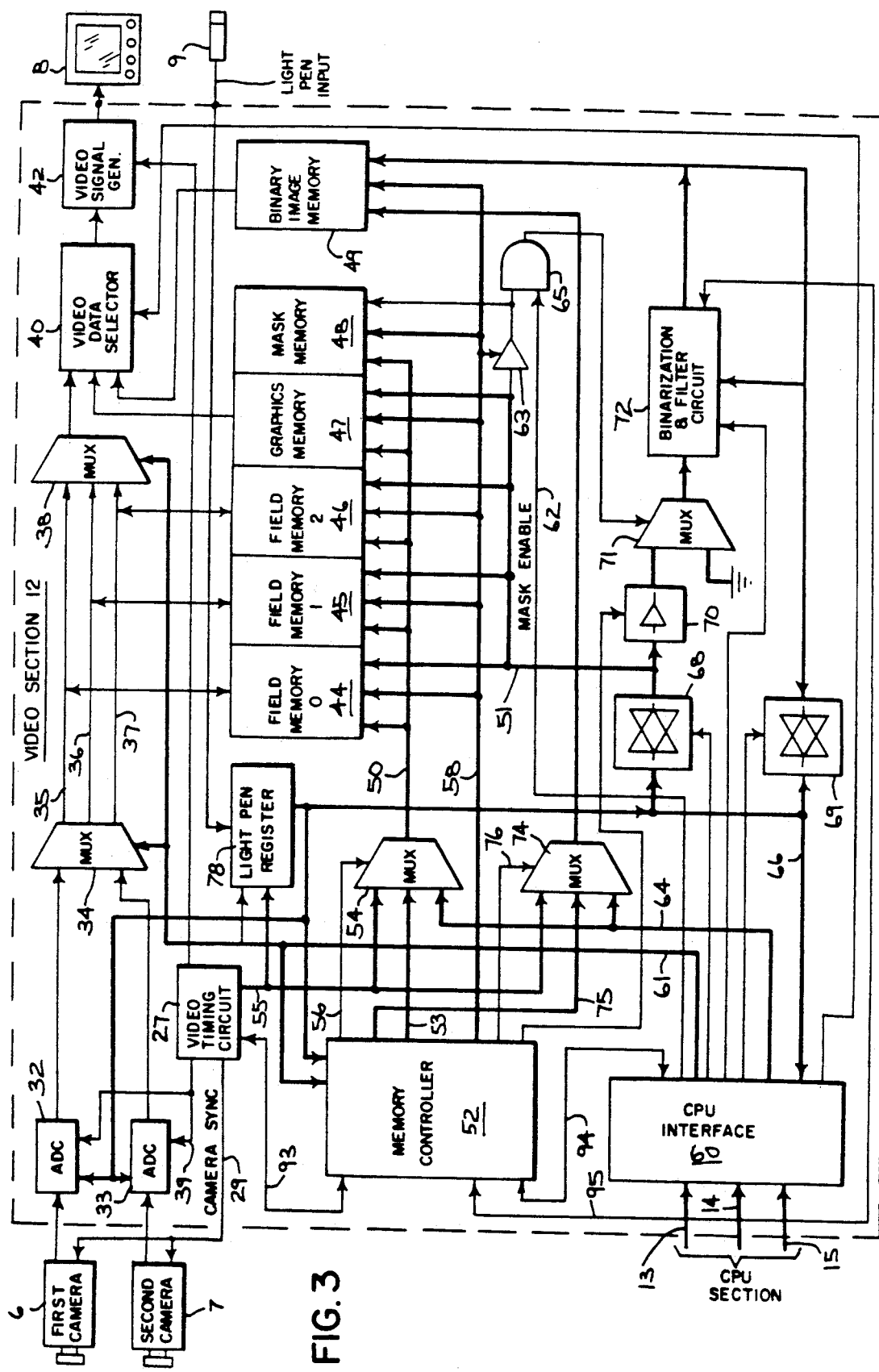
FIG. 3 depicts the video signal processing section of the video image processor.

The image processor 10 consists of a central processing unit (CPU) section 11 and video signal section 12, the details of which are shown in FIGS. 2 and 3 respectively. The CPU section 11 is built around a set of three buses consisting of a set of control lines 13 forming a control bus, a parallel address bus 14, and a parallel data bus 15. A microprocessor (or microcomputer) 16 is coupled to the three buses 13–15 and executes a program which controls the operation of the image processor to acquire and analyze video images received from the cameras.

The program for the microprocessor 16 is stored in a read only memory (ROM) 19 which is also coupled to the three buses within the CPU section. A random access memory (RAM) 18 provides storage locations for the different variables employed by the microprocessor 16 during the execution of the program and for the results of the image analysis. An electrically erasable programmable read only memory (EEPROM) 22 is coupled to the set of control lines 13, the address bus 14 and the data bus 15. The EEPROM stores data, provided by the operator, which configures the image processor 10 and defines the image analysis to be performed.

An input/output interface circuit 24 also is connected to the control address and data buses 13, 14, and 15. The I/O interface circuit 24 provides sets of discrete input and output lines 25 and 26, respectively. Two input lines 25 receive separate trigger signals which indicate when images are to be acquired. The different ones of the output lines 26 provide strobe light fire signals, a processor busy output signal and a number of discrete signals which indicate the results of different image analyses performed by the processor. The I/O interface 24 also includes a conventional RS-232 serial port 21, which can be employed to couple the image processor 10 directly to a computer terminal or remote computer.

The present image processor 10 is shown in FIG. 1 housed in a module located within a rack of a programmable controller system 1. For such an installation, the CPU section 11 includes a backplane interface 28 for coupling the image processor 10 to the backplane of the programmable controller rack. This permits the image processor 10 to receive configuration data and commands from the programmable controller processor 3, as well as transmit the analysis results to that processor. The backplane interface 28 consists of conventional circuits such as those used by other modules of the programmable controller system to couple those modules to the backplane of the rack. Depending upon the characteristics of the particular programmable controller with which the present image processor 10 is to used, one of ordinary skill in the art would be readily able to design the proper backplane interface 28. The remainder of the image processor components are contained in the video section 12 illustrated in FIG. 3. The video section 12 receives image data in the form of conventional analog video signals from the two cameras 6 and 7, with each signal coupled to one of two analog-to-digital converters (ADC) 32 and 33. The analog-todigital converters digitize the analog video signal from the corresponding camera into a series of digital picture elements (pixels) with the gray scale luminance of each pixel represented by a multibit digital number. The analog-to-digital converters are conventional devices into which high and low voltage reference values can be loaded over a parallel data bus to define the digital conversion parameters. Each of the analog-to-digital converters is clocked by a signal from video timing circuit 27 to produce 512 pixels per horizontal scan line from its respective camera. The video timing circuit 27 also provides a horizontal and vertical synchronization signal to the cameras 6 and 7.

The multibit outputs of the analog-to-digital converters 32 and 33 are coupled in parallel to different inputs of a first video multiplexer 34. The first multiplexer 34 is configurable to selectively couple each of the two parallel inputs uniquely to one of three parallel video buses 35-37. Each of the three digital video buses 35-37 is connected to an input of a three-to-one second video multiplexer 38. The output of the second multiplexer 38 is coupled to one input of a video data selector 40, which selectively couples digital input data to a video signal generator 42. The video signal generator 42 converts the data from the video data selector 40 into a conventional analog video signal which is applied to the external monitor 8.

Each of the three video buses 35, 36 and 37 also is coupled to a first data port of one of three dual ported field memories 44, 45 and 46, respectively. The second data port of each of the dual ported field memories 44-46 is coupled to a common memory data bus 51. Each of the field memories 44-46 has a sufficient number of memory locations to store a separate 512×256 pixel grey scale video image field from the output of the analog-to-digital converters 32 and 33. The field memories collectively form a mechanism for storing video images with each field memory being a section of that mechanism.

A graphics memory 47, which is also a dual ported RAM, has one data port coupled to the memory data bus 51 and a second data port coupled to another input of the video data selector 40. The graphics memory stores a video image comprising alpha-numeric characters and graphic symbols generated by the CPU section 11 for display on the monitor 8. These characters and symbols are used to set-up the processor for image analysis and to display the analysis results. The address inputs of the field memories 44-46 and the graphics memory 47 are coupled to a common parallel video address bus 50. Each pixel stored in the field memories can be addressed by a digital number, having a group of bits that specifies the field scan line in which the pixel is located and another group of bits which specifies the horizontal image column for the pixel.

The read and write operations of the field memories 44-46 and the graphics memory 47 are governed by a memory controller 52. When data is to be read from the memories, the memory controller generates a multibit address on output lines 53 designating one of the storage locations in each of the field and graphics memories. The address output lines 53 from the memory controller 52 are coupled to an input of a first three-to-one parallel address multiplexer 54. The multibit output of the first address multiplexer 54 is coupled to the memory address bus 50. Another multibit input of the first address multiplexer 54 is coupled to an address generator within the video timing circuit 27 which provides memory addresses for image storage and display. Which one of the inputs to the first address multiplexer 54 is coupled to its output is determined by a signal on line 56 from the memory controller 52. The memory controller 52 also generates conventional read/write control signals on a set of control lines 58 which are coupled to each of the field memories 44, 45, and 46 and to the graphics memory 47.

Frame reset cameras can be used as an alternative to RS-170 cameras 6 and 7. In this case, the cameras scan asynchronously to the monitor 8 scan. Therefore, in this alternative, the video timing circuit 27 would have to generate separate address signals for image acquisition and display. Separate buses would couple these signals to multiplexers 54 and 74, which would now be four-to-one devices. One of these address signals would be coupled to the memories 44-49 depending on whether an image was being stored or read out for display.

A mask memory 48 is also connected to the memory address bus 50 and control lines 58. The mask memory 48 is divided into two planes each storing an image of a processing mask for the video image from one of the cameras 6 or 7. The function of these masks will be described subsequently. A logic gate 63 couples one bit line of the memory data bus 51 to the data terminal of the mask memory 48. The gate 63 is enabled by a signal on one of the memory control lines 58.

The CPU section 11 is coupled to the video section 12. Specifically, the set of control lines 13, address bus 14, and the data bus 15 are coupled to a CPU interface circuit 60 in the video section 12. The CPU interface 60 includes a conventional address decoder which responds to specific addresses present on CPU bus 14 by generating control signals for different components within the video section 12. In addition, the CPU interface circuit 60 contains a series of addressable data registers into which the microprocessor 16 writes data to configure the operation of the video section. For example, these registers store control bits which are applied to control lines 61 to configure each of the video multiplexers 34 and 38.

The CPU section address bus 14 is coupled by a CPU interface address bus 64 to the third input of the first address multiplexer 54. The data bus 15 from the CPU section 11 is coupled by the CPU interface 60 to a CPU interface data bus 66. The CPU interface data bus 66 connects to two sets of bidirectional data buffers 68 and 69. The first set of data buffers 68 couples the CPU interface bus 66 to the memory data bus 51 in response to an enable signal from the CPU interface 60.

When a set of data buffers 70 is enabled by a control signal from the memory controller 52, the memory data bus 51 is coupled to one set of inputs of a parallel data bus multiplexer 71. Another set of parallel inputs of the data bus multiplexer 71 are all grounded. The data bus multiplexer 71 couples one set of inputs to its output in response to an enable signal from AND gate 65. One input of the AND gate 65 receives a mask enable signal on line 62 from CPU interface 60. The other input of AND gate 65 is coupled to the data terminal of the mask memory 48.

The parallel outputs of data bus multiplexer 71 are coupled to the inputs of a binarization and filter circuit 72. The binarization and filter circuit 72 comprises a conventional circuit which converts a multibit input number into a binary number depending upon the numerical relationship of the input number to a predefined threshold value. The binarization and filter circuit 72 converts a gray scale pixel into a binary pixel having either a black or white luminance level. Alternatively, the input member can be compared to two thresholds, or "windowed", and value of the binary conversion is determined by whether the input member is between the two thresholds. In addition, this circuit 72 can perform conventional two dimensional filtering on the image to remove undesirable artifacts or to reduce complex objects in the image to simpler shapes.

The binary output of the binarization and filter circuit 72 is coupled to the second set of data buffers 69 and to one data port of a dual ported binary image memory 49. The other data port of the binary image memory 49 is coupled to a third data input to the video data selector 40. The address input of the binary image memory 49 is coupled to the output of a second three-to-one address multiplexer 74. The second address multiplexer 74 receives an address signal input via line 64 from the CPU interface 60, another address signal input from address lines 55 originating at the video timing circuit 27, and a third address signal from the memory controller 52 over a line 75. A signal from the memory controller 52 via line 76 controls which one of the three input address signals the second address multiplexer 74 couples to the binary image memory 49. The binary image memory 49 also receives control signals over the set of control lines 58 from the memory controller 52.

The memory controller 52 contains a conventional memory access arbitration circuit which receives memory requests from and sends request acknowledgments to the binarization and filter circuit 72, the CPU interface circuit 60, and the video timing circuit 27. In response to these memory requests, the memory controller 52 generates the various control signals to govern the operation of the address multiplexers 54 and 74 and the different memory devices 44-49.

The video section 12 also contains a light pen register 78 which is coupled to the address lines 55 from the video timing circuit 27. The register can be read by the CPU section 11 to obtain the field memory address of the pixel being stored from the analog-to-digital converters 32 and 33. From this address, the CPU section 11 can determine the scan line and column coordinates of that pixel in the video image. In response to a signal from a light pen 9, the light pen register 78 latches the address from the video timing circuit 27. Since the monitor 8 and the cameras 6 and 7 preferably are scanned in synchronism, this latched address represents the position on the screen of monitor 8 at which the light pen 9 is then positioned. The light pen position address can be read from the light pen register 78 by the CPU section 11 over data buses 15 and 66.

Image Processor Operation

Figure 4:
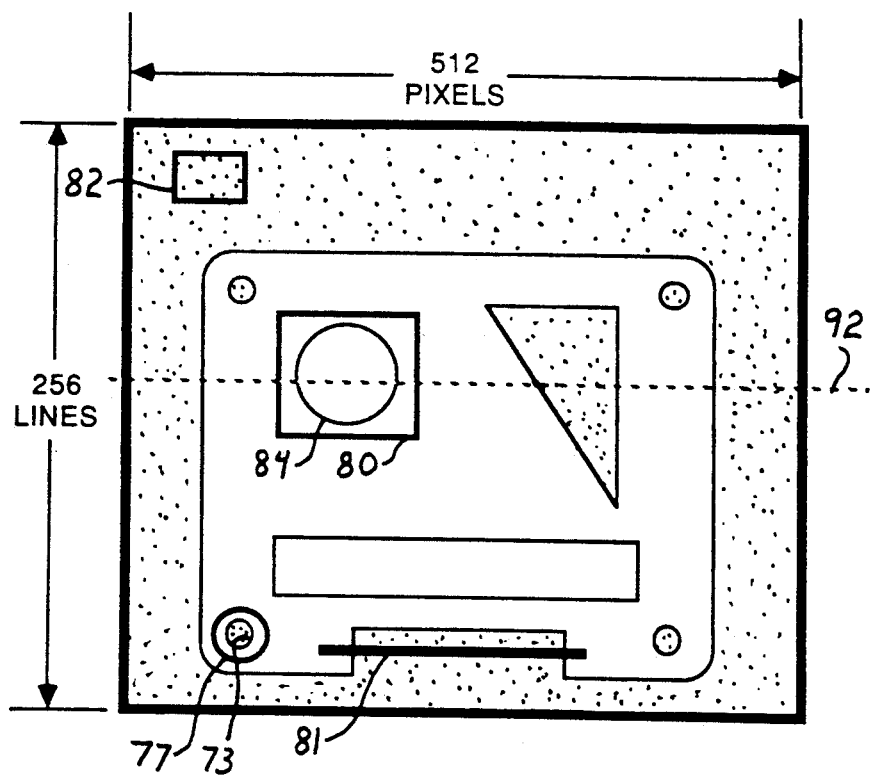
FIG. 4 shows a typical display of a workpiece image on the monitor in FIG. 1.

The image processor 10 analyzes the video images from cameras 6 and 7 using a plurality of operator defined evaluation windows and line gauges to sense different features of objects in each camera's image. For example, FIG. 4 depicts the image of the workpiece 5 acquired from the first camera 6 as it would appear on monitor 8. This image also contains indicia for image analysis windows and line gauges. For example, a rectangular analysis window 80 is defined around the cylindrical projection 84 of the workpiece and a circular shaped window 77 encompasses a hole 73 through the workpiece. A line gauge analysis tool 81 is shown positioned to detect the width of the cut out along the bottom edge of workpiece 5. A number of evaluation windows and line gauges can be separately defined with respect to the image from each camera 6 and 7.

A basic analysis of the image is performed by counting pixels within the windows 77 and 80 and along the line gauge, which pixels have a luminance that is above and below an operator defined luminance threshold. This counting operation can be carried out by circuits in the binarization and filter circuit 72 or by the microprocessor 16. U.S. patent application Ser. No. 07/057,797 filed on Jun. 3, 1988, now U.S. Pat. No. 4,916,640, entitled "Video Image Processing System", discloses a similar vision processor which utilizes windows and line gauges to perform image analysis. This document also provides a description of how a light pen is employed to set up the processor analysis by selecting icons on the screen of a monitor. The description contained in that document is incorporated herein by reference.

The monitor image also contains indicia for the position of a brightness probe 82. This probe is an area of fixed size which can be positioned in the image by the operator. As is described in copending U.S. patent application Ser. No. 07/031,414 filed on Mar. 30, 1987, entitled "Machine Vision System With Illumination Variation Compensation", now U.S. Pat. No. 4,855,830 the luminance of the pixels in the probe area is measured. The measurement result is used to detect a variation in the overall luminance of the image due to a change in the illumination of the cameras' field of view from the time of the analysis set-up. As will be described, this measurement enables the microprocessor 16 to adjust the voltage references of the analog-to-digital converters so that the digitizing of the camera signals compensates for the effects of the illumination change.

The setup parameters of the analysis windows, line gauges and brightness probe for each image are stored in the EEPROM 22 as a table of configuration data. The configuration data stored in the EEPROM table is used by the microprocessor 16 to load data in registers of the CPU interface 60 of FIG. 3 which generate the proper control signals for different components of the video section 12. This configuration data table is graphically in FIG. 5. There are two of these configuration data tables, one for the image from each camera 6 and 7. A first section 86 of table memory locations stores system data which configures the image processor 10 in general. As previously described, the two cameras 6 and 7 each produce a two-field interlaced scan frame of the image. Depending upon the degree of vertical resolution required, the operator can chose whether the image analysis is performed on only one field or both fields of the image. An indication of the vertical resolution (i.e. one or two fields) is stored in the system data section 86.

Also stored in this section 86 is an assignment of which of the two camera trigger inputs 25 control image acquisition from each camera. The cameras can be assigned to separate trigger inputs or a single input can trigger acquiring an image from both cameras 6 and 7 simultaneously. As noted before, the camera image has 512 pixels in each horizontal line. In processing the image, all 512 pixels can be used or if that degree of horizontal resolution is not required, every other horizontal pixel can be used; thus providing 256 pixel horizontal resolution. A pair of bits in the system data section 86 indicate whether every pixel or every other pixel along each scan line is to be processed. The high and low voltage references for the analog-to-digital converters 32 and 33 used during analysis set-up are also stored in the system data section 86. The system data section 86 of the configuration table in EEPROM 22 stores other data needed for the system operation, but which is unrelated to the function of the present invention.

Figure 5:
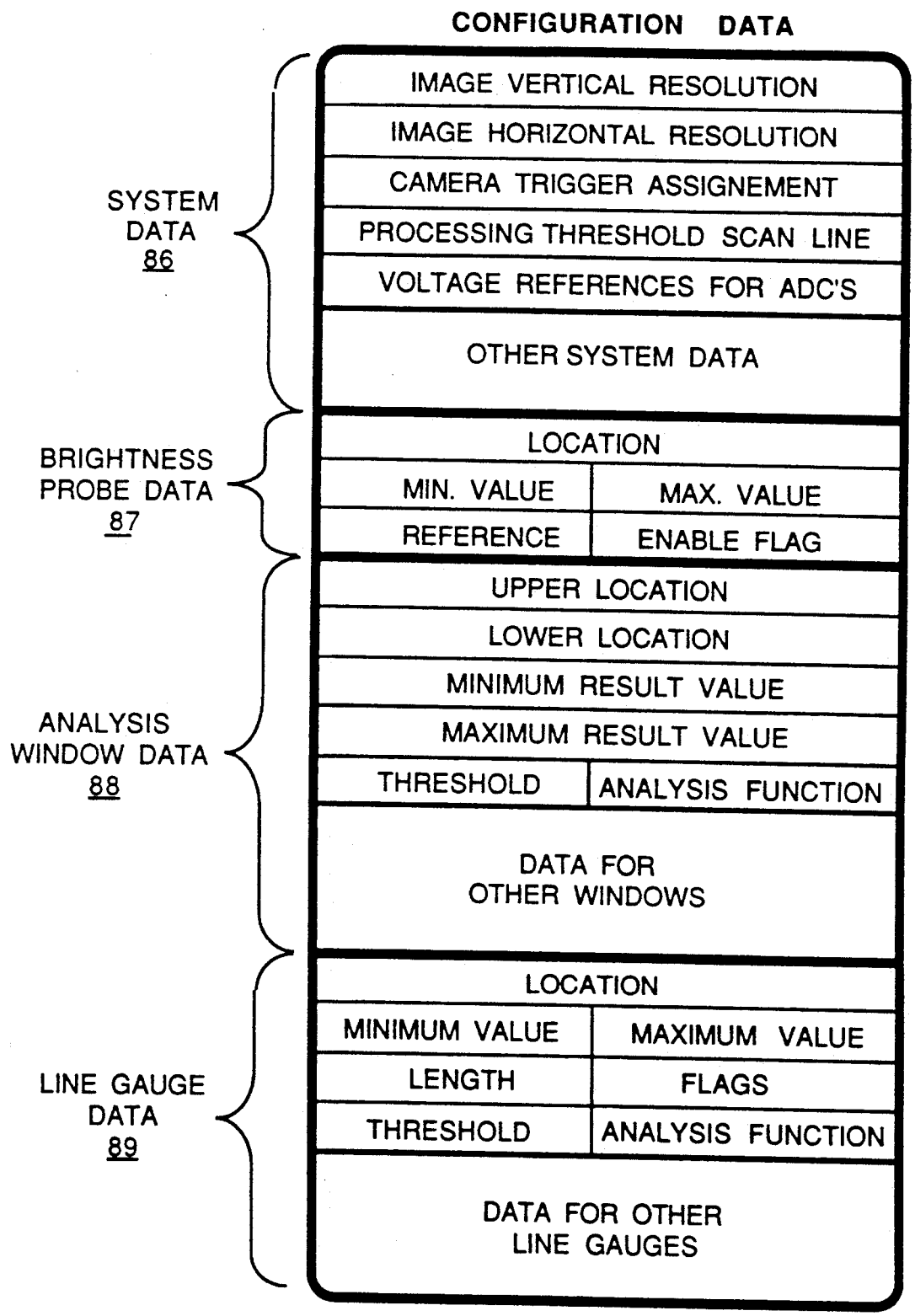
FIG. 5 is a representation of an exemplary memory structure of configuration data for the present image processor.

The configuration data table depicted in FIG. 5 has a second section 87 which contains a definition of the brightness probe 82. This definition includes two bytes which specify the video line and column coordinates of a corner of the probe area. As the brightness probe 82 has a fixed size, this single set of coordinates specifies its location. The value of the luminance of the brightness probe area at the time of analysis set-up is stored in this section as a reference level to which subsequent measurements are compared to detect a luminance change. Another bit in this second configuration data table section 87 acts as a flag to indicate if brightness compensation has been enabled by the user.

Each of the analysis windows has a data block within a third section 88 of the configuration data table at which the data defining the window is stored. As illustrated in FIG. 5, this data includes a two byte word which specifies the image address for the location of an upper corner of a rectangular window. Another word specifies the location of the opposite lower window corner. These two locations define the position of the rectangular window in the image and its size. If a non-rectangular window is defined, the two location words are used to define its shape and position. For example, a circular window is defined by one word indicating the center of the window and the other word stores the window's radius. The window data also includes a number which indicates the analysis function to be performed on the window's pixels, a threshold luminance level for binarizing the image pixels, and words with the maximum and minimum acceptable values for result of the analysis.

Similar data blocks are located in a line gauge data section 89 to define each of the line gauges. In order to specify the position of each line gauge, the pixel coordinate location of an end of the line is stored along with a flag bit indicating whether the line is horizontal or vertical, and the line's length in pixels. A binarization threshold luminance level is also stored. A number indicating the analysis function to be performed on the pixels along the line gauge is also contained in section 89 of the configuration data table.

A data table also is defined in RAM 18 in which to store the image processing results. Such a table is similar to those used in previous image processing systems.

After the windows and line gauges have been defined by the system operator, the microprocessor 16 uses the configuration data to create an image processing mask for each camera's image. As will be described in detail, the masks are used during image analysis to select the pixels within the windows from other pixels of the acquired image. Each mask is a 512×256 pixel array with each pixel within a window or along a line gauge for the image represented by a one logic level bit and the pixels outside these areas represented by a zero logic level bit. If an acquired image consists of two fields, the same mask is used to process each field of the image.

The two mask arrays are stored in separate planes of the mask memory 48 shown in FIG. 3. To store the mask, the CPU section 11 sends a request to the memory controller 52 for access to the mask memory 48 in the video section 12. When the access is granted, the set of data buffers 68 and the bit gate 63 are enabled by control signals from registers in the CPU interface 60. The first address multiplexer 54 is also enabled to couple the CPU address bus 64 to the mask memory 48 via the video address bus 50. Bits of data for the mask are then sent from the microprocessor 16 over the CPU interface data bus and the memory data bus 51 to the mask memory 48 where control signals from the memory controller cause the mask data to be stored in the proper plane of the memory 48.

Once the set-up functions are complete, the image processor 10 can be placed in operation to process images. With reference to FIGS. 2 and 3, the acquisition of the data from the cameras 6 and 7 is in response to trigger signals received by the CPU section 11 through trigger inputs 25. The two cameras scan in synchronism and continuously output a video signal to the respective analog-to-digital converter 32 or 33. These converters are also continuously digitizing the video images carried by the camera signals. However unless a trigger signal is received the digitized video images are not stored in the field memories 44–46.

The image processor 10 can be configured by the operator to simultaneously acquire separate images from both cameras in response to a common trigger signal. Alternatively, the two cameras can respond to separate trigger signals thereby acquiring images at different times. When a trigger signal is received, the microprocessor 16 looks at the configuration data to determine to which of the cameras that signal has been assigned. In response to the trigger input and the configuration data, the microprocessor 16 via output lines 26 triggers a strobe light for which is enabled for each of the designated cameras. Although strobe lights are not necessary is all applications, they are employed "freeze" fast moving objects for the camera.

At the time an image acquisition trigger signal is received by the CPU section, the microprocessor 16 assigns one of the then available field memories 44–46 to store the next field from the camera. Depending upon the chosen degree of vertical resolution, one or two field memories will be assigned to the camera from which the image is to be acquired. If both fields are to be stored, two field memories are assigned, one for the even field and another for the odd field. A flag bit indicates which field is stored in which memory in order that the image can be reassembled for processing and display. The field memory assignment is performed by the CPU section 11 sending control data to the video section 12 to configure the first video multiplexer 34 to couple the analog-to-digital converters 32 and 33 to the assigned field memories 44–46. In addition, the memory controller 52 also receives an indication as to which field memories to enable for data storage.

The video section 12 is notified by the CPU section 11 to acquire an image and the video timing circuit 27 sends a memory access request to the memory controller 52. Regardless whether other functions are being performed by the video section 12, this request causes the memory controller to configure the video section circuitry for the storage of new image data. The memory controller 52 issues a control signal on line 56 which instructs the first address multiplexer 54 to couple the address lines 55 from the video timing circuit 27 to the field memories 44–46. During the next vertical blanking interval in the camera's video signal, the memory controller places the appropriate one or ones of the field memories into the write mode. The memory controller determines which field memories are to be enabled based on data stored in the control registers in the CPU interface 60 by microprocessor 16. As the digitized pixels are being clocked out the analog-to-digital converters 32 and 33, the video timing circuit 27 is also stepping the addresses of the enabled field memories to store those pixels. If the video field interlaced mode has been selected for the incoming image, the memory controller 52 enables a different field memory at the next video vertical blanking interval to store the second field of the frame. The first video multiplexer 34 also is switched to couple the output of the analog-to-digital 32 or 33 to that field memory.

The image data must first be stored in the field memories 44-46 before it can be processed and analyzed. However, since these memories are dual ported devices, the image processor 10 can begin to read out data for pixels at the beginning of the image before the data for the entire image has been stored. The first step in the analysis process is to evaluate the relative image luminance as measured by the brightness probe 82 and adjust the analog-to-digital conversion to compensate for an illumination change. If both fields of the image frame are being acquired, the brightness probe area in each field is analyzed and the result used to compensate the digitizing of the remainder of the field. Once the first line of the brightness probe area 82 for a field has been acquired, the microprocessor 16 can begin accessing its pixels to compute the probe's luminance. Even though all of the probe pixels have not been acquired at this time, the luminance computation will not outpace the image acquisition.

Figure 6:
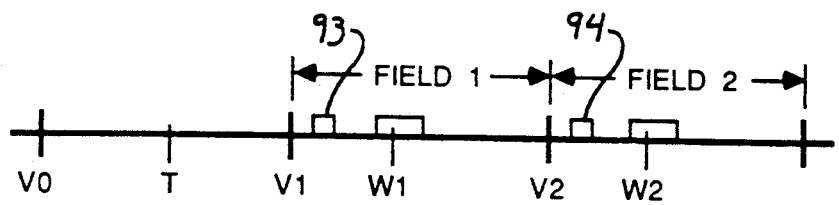
FIG. 6 is a time line for the acquisition of a video image composed of two interlaced fields.

The determination of when the brightness probe computation can commence is made by a timed interrupt which is set upon receipt of the trigger signal. FIG. 6 shows a time line of three image fields being consecutively transmitted by one of the cameras. At time T, the CPU section 11 receives a trigger signal and the microprocessor 16 immediately reads the contents of the light pen register 78 in FIG. 3. When the light pen 9 has not been used, the contents of this register 78 corresponds to a count of the pixels received from the analog-to-digital converters 32 and 33 since the last vertical blanking interval. The microprocessor 16 uses this count to determine the number of pixel periods until the next vertical interval (number of pixels in a field minus current count). The number of pixel periods remaining is graphically illustrated as the period between T and $V_2$ in FIG. 6. To this number, the microprocessor adds the number of pixel periods from the beginning of the next field to the second line of the brightness probe. This brightness probe is indicated by box 93 in FIG. 6. The sum is the number of pixel periods to when the evaluation of the brightness probe luminance can start. This is converted into time by multiplying the number of pixel periods by the amount of time in a pixel period. The resultant amount of time sets an interrupt timer for the microprocessor 16. When the interrupt timer expires, the brightness probe analysis software task is called by the microprocessor 16. If the two field acquisition mode has been chosen, a similar computation is done for the brightness probe area (box 94 of FIG. 6) in the second field and a second interrupt timer is set. In order to optimize the image processing speed, the brightness probe 82 should be positioned as near to the top of the image as possible.

The luminance of the pixels in the brightness probe is measured using techniques similar to those employed in previous image processors with illumination variation compensation. As in these other processors, the result of the brightness probe measurement is compared to the luminance reference value stored in section 87 of the configuration data table in the EEPROM (see FIG. 5). The difference between the present luminance from the brightness probe and the reference level provides a correction factor which is used to adjust high and low voltage references of the corresponding analog-to-digital converter 32 or 33. For example, if the brightness probe measurement detects a luminance decrease, each of the voltage references is decreased by a proportional amount. The adjustment of the voltage references compensates for illumination differences among strobe light flashes and due to changes in ambient light. The voltage references of the analog-to-digital converters are immediately changed with the new values in order that the pixels in the remainder of the incoming image field will be brightness compensated.

After the correction factor has been computed by the microprocessor 16, the CPU section 11 can begin evaluating the analysis windows and line gauges, even though pixels for the entire image have not been stored in the field memory. However, the evaluation must be delayed until enough image pixels have been acquired to insure that the image evaluation will not outpace the acquisition of image. This insures that the evaluation process will not run out of the pixels before all of the necessary pixels are acquired. In order to provide this safeguard, the system configuration data section 86 in EEPROM 22 stores a processing threshold scan line for the highest positioned window in the image. This threshold line is illustrated as dashed line 92 across the monitor display shown in FIG. 4.

The position of the processing threshold scan line is preferably computed by the CPU section 11 during the analysis set-up phase. After all of the image analysis windows have been defined, the microprocessor 16 determines which one is positioned highest in the image by inspecting each window's location words stored in configuration data section 88 of EEPROM 22. The determination of the processing threshold scan line's position is based on several factors. One is the position of the first scan line of the window. Another factor is the analysis function to be performed on the pixels within the window and the amount of time (i.e. system clock periods) that are required to process each pixel. For example, simply counting white and black pixels without any filtering of the image will be relatively rapid as compared with a processing function that involves two dimensional filtering. The faster the processing, the lower the threshold scan line has to be in the image so that the processing will not outpace image acquisition. In analyzing a window, only the pixels therein are read out of the field memories. Therefore, another factor in determining the processing threshold scan line position is the shape of the window. If the window is relatively narrow, the pixels along a scan line in the window may be read out and processed at a faster rate than the rate at which an entire line of pixels from the camera is stored. In this case, the processing can outpace the storage of the image and the processing threshold scan line will have to be set lower in the image than for a relatively wide window with more pixels per line to analyze.

As an alternative, the processing threshold scan line can be manually positioned by the operator during the set-up phase, as an alternative to the CPU section 11 determining its position. In this situation, the operator empirically positions an indicia of the processing threshold scan line in the image display once the highest window has been defined. The user then observes whether or not the image processing outpaces the image acquisition and adjusts the position of the processing threshold scan line accordingly. A number of observing and repositioning iterations may have to be carried out until a satisfactory position for the processing threshold scan line in obtained. With either method, the position of the processing threshold scan line is then stored in the EEPROM 22 by storing the address of the first pixel in that line.

The time at which to begin processing the window's pixels is determined by a timed interrupt in a manner similar to that employed in respect of the brightness probe 82. Specifically, at the time that the trigger signal is received, the microprocessor 16 uses the current pixel address in light pen register to calculate the number of pixel periods remaining in the image field being scanned. This number is added to the address of the first pixel in the processing threshold scan line stored in the system data memory section 86 to calculate the number of pixel periods from the trigger signal input until processing can begin. With reference to FIG. 6, if only one field is being acquired the processing can begin at point W1 in Field 1. However, if both fields of the image frame are being acquired for image analysis, the processing cannot commence until point W2 is the second field. The number of pixel period intervals is multiplied by the amount of time of each period and an interrupt timer is set with the product.

When a window interrupt timer expires, an interrupt routine is called which causes the CPU section 11 to begin executing a window analysis software routine. This routine reads the designation of the first window to process from a table in RAM 18 that lists the windows in the order in which they will be processed. For example, in the image in FIG. 4, window 80 could be the first one processed. The microprocessor 16 then accesses the configuration data stored in the EEPROM 22 for this window.

Figure 7:
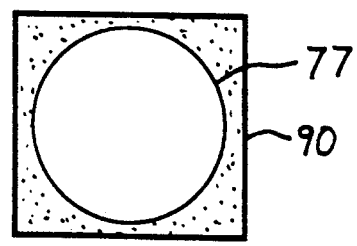
FIG. 7 shows an area of interest defined around a non-rectangular window.

Since the windows may have various shapes, such as circular window 77, computing the addresses of the pixels within the window may be complex and time consuming during the image processing phase. Therefore, in order to speed up reading pixel data from the field memories 44-46, a rectangular area of interest is defined which encloses the window. The area of interest is defined by determining the rightmost and leftmost horizontal image coordinate (i.e. pixel column) of the window, and the window's uppermost and lowermost vertical image coordinate (i.e. scan line). If the window is rectangular, such as window 80 in FIG. 4, the area of interest is essentially the window itself. However, to further facilitate addressing, the horizontal and vertical coordinates of the area of interest may all be defined on even numbered columns and lines in the image. FIG. 7 depicts the area of interest 90 for circular window 77 in FIG. 4. In this case, the area of interest 90 is a square which encloses the circular window 77. The square can either be tangent to the circular window, or as shown, it can be slightly larger. As this area of interest contains scan lines which are of equal length and which start at the same horizontal coordinate in the image, a simple raster scan addressing scheme can be employed to read out the area of interest pixels from the corresponding field memory or memories.

Once the area of interest has been defined for the window currently being processed, the microprocessor 16 notifies the memory controller 52 of the image coordinate boundaries of the area of interest and to begin addressing the field memory 44, 45, or 46 that contains the image data. The coordinate boundaries are employed by the memory controller to generate memory addresses of the pixels within the area of interest. The memory controller 52 sequentially addresses the pixels in the area of interest and sends the data from the field memory onto the memory data bus 51. If both fields of the image were stored, the memory controller alternates reading scan lines of pixels from the two field memories 44-46 which contain the fields of the image. Depending upon the horizontal resolution selected by the user for processing the image, every pixel or only every other pixel in the window is read out and processed. Other degrees of horizontal resolution can also be provided.

Since the field memories 44-46 are dual ported devices, the area of interest of the image from one camera 6 or 7 can be interleaved in time with the addressing of the field memories by the video timing circuit 27 to store an incoming image from the other camera.

In order to analyze the area of interest pixels, the CPU section 11 has stored data in the control registers of the CPU interface circuit 60 to enable the set of data buffers 70 to couple the memory data bus 51 to the data multiplexer 71 as shown in FIG. 3. Another register of the CPU interface 60 issues an active mask enable signal over line 62 to AND gate 65. As the pixels of the area of interest are being read from the selected field memory, corresponding image elements of the mask for that image are being read from the respective plane of the mask memory 48. The one bit mask image element corresponding to each video image pixel is coupled by the AND gate 65 to the selector input of the data multiplexer 71. If the mask bit is a logical one, indicating that the image pixel data currently on the memory data bus 51 is within the window, the data multiplexer 71 couples that pixel data to the binarization and filter circuit 72. Otherwise, if the mask bit is zero indicating the current image pixel is outside the window being processed, the grounded input of the data multiplexer 72 is connected to the binarization and filter circuit 72. This latter state of the data multiplexer 72 forces the non-window pixels to be zero regardless of the actual field memory data. In this manner, the mask stored in the plane of the mask memory 48 selects the pixels of the rectangular area of interest which are within the analysis window.

Each of the digital image pixels read from the selected field memory 44, 45, or 46 is a multibit number representing the gray scale luminance value for a video picture element. The binarization and filter circuit 72 compares each of these multibit pixel values to the luminance threshold for the window being processed. The threshold for each window was transferred by the microprocessor 16 from the EEPROM configuration data table 88 to the binarization and filter circuit 72 at the start of each window's analysis. Each pixel is converted into a single bit whose value is either one or zero depending upon whether the gray scale luminance value for the pixel is above or below the luminance threshold. The circuit 72 may also perform conventional two-dimension filtering on the binary pixel data to remove undesirable artifacts in the image or to highlight features of interest.

The final binary value for each pixel is fed from the binarization and filter circuit 72 to the data input of the binary image memory 49 where it is stored in one of its image planes. The binary image memory 49 is addressed by a second address signal from the memory controller 52 through the second address multiplexer 74. This latter memory 49 also receives control signals via the control lines 58 from the memory controller 52.

At the end of the processing of the pixels in the highest window 80 in the image, the respective plane of the binary image memory 49 contains a binary representation of the portion of the image within that window. As noted above, the binarization and filter circuit 72 also includes counters which tabulate white and black pixels. The microprocessor 16 now reads these counters and then clear them for processing the next window. The counts for each window are stored in RAM 18 by the microprocessor 16.

The pixels in the remaining windows defined in the image can then be sequentially processed by the binarization and filter circuit 72 and stored in corresponding memory locations of the binary image memory 49. If images from both cameras are being acquired simultaneously, the windows in the other image then can be processed in a similar manner.

With continuing reference to FIGS. 2 and 3, as the binary pixel conversion for each of the windows is completed, the microprocessor 16 may access the binary data stored in the binary image memory 49 to complete the analysis of the window data. For example, once the pixels for the highest window 80 in the image have been binarized and stored, the microprocessor 16 can access that data. To do so, the microprocessor transmits a control signal on a associated line 13 and the address of the data within the binary image memory 49 to the CPU interface circuit 60. The control signal causes the interface circuit 60 to generate a memory access request to the memory controller 52. When time is available the memory controller 52 sends the proper set of control signals to the binary image memory 49 and signals the second address multiplexer 74 to couple the address from the microprocessor 16 from the video section CPU interface address bus 64 to the address input of the binary image memory 49. In response to the signals, the binary image memory 49 outputs the corresponding pixel data to the second set of data buffers 69 which has been enabled to pass the data via the CPU interface data bus 66 back to the CPU section 11.

In a similar manner the microprocessor 16 can also access the field memories to obtain the gray scale pixel values for processing. It may be faster to analyze the line gauge pixels in this manner since two dimension filtering is not performed on them. For a detailed description of the different image analysis functions which can be implemented in the present image processor, reference should be made to the previously identified U.S. Patent Application entitled "Programmable Controller Vision System".

As noted previously, the acquisition of images from the two cameras 6 and 7 can be triggered separately. For example, assume that the image from one camera has been acquired and is being analyzed when the trigger signal for the other camera is received. In this case, the analysis of the first image can occur interleaved in time with the storage of the second image. However, when the brightness probe for the second image is ready to be evaluated (i.e. the associated interrupt has occurred), the brightness measurement must be done immediately so that the analog-to-digital converter voltage references can be adjusted for the remainder of the second image. Therefore, the analysis of the first image must be halted so that the CPU section 11 can access the video section 12 to acquire the brightness probe pixels from the respective field memory 44, 45, or 46 and adjust the voltage references of the associated analog to digital converter 32 or 33. Once the brightness probe software task is completed, the analysis of the first image can resume. If the interrupt for processing the highest window in the second image occurs before the first image analysis is complete, that interrupt is not handled, instead the task is placed in a queue for execution.

The results of the image analysis are stored in data tables within the RAM 18 of the CPU section 11 and can be displayed on monitor 8 at the request of the operator. In which event, the microprocessor 16 accesses the result data in RAM 18 converting the digitally stored results into alphanumeric characters and graphic symbols which are stored in the graphics memory 47. These stored characters and symbols are then transferred by the video data selector 40 to the video signal generator 42.

The present image processor enables different versions of the acquired image to be displayed on the screen of video monitor 8. Which of these different versions is displayed is selected by the second video multiplexer 38 and the video data selector 40. A real-time video image may be displayed on the monitor 8 by the video data selector 40 coupling the output of the second video multiplexer 38 to the video signal generator 42. The second video multiplexer 38 is enabled to select one of the video buses 35–37 which carries the digital signal for the real-time image. This selection couples the digitized output of one of the cameras 6 or 7 to the video signal generator 42 which converts the output back into an analog video signal for display by monitor 8. Alternatively, the second video multiplexer 38 and video data selector 40 can be used to display a gray scale image which was previously stored in the field memories 44–46. In this instance, the coupling by the multiplexer 38 and video data selector 40 are the same as for the real-time image except that the video data on the selected bus 35–37 is generated by a sequential addressing of the field memories by the video timing circuit 27; rather than by the first video multiplexer 34 coupling one of the camera signals to that video bus. The binary image produced by the image processing can also be displayed on the monitor 8 by the video data selector 40 coupling the output from a plane of the binary image memory 49 to the video signal generator 42.

The second video multiplexer 38 and the video data selector 40 are controlled by separate signals from registers in the CPU interface 60 which are loaded with the proper data by the microprocessor 16. When data from the second video multiplexer 38 or the binary image memory 49 is being displayed on the monitor 8, alphanumeric characters and graphic symbols, stored in the graphics memory 47, can be superimposed upon the selected image. In this instance the video data selector 40 is enabled to receive data from the graphics memory 47 and the graphics data from memory 47 is superimposed to cover up the portions of the video display image with the characters and symbols. This type of superimposition of images is used frequently in the set-up mode of operation where various icons and menus are displayed over the real-time image so that the different configuration parameters may be altered while the operator is able to see the effects of the parameter selection.

In this mode of operation the light pen 9 is employed to select different menu items or icons displayed on the screen on monitor 8. The triggering of the light pen 9 results in the light pen register 78 freezing the then current address from the video timing circuit 27 which corresponds to the location on the screen at which the light pen is positioned. This frozen address can be read by the microprocessor 16 through the CPU interface 60 to obtain the screen position and thereby identify the icon or menu item being selected by the operator.

Although the present invention has been described in the context of a particular image processor circuit, it is readily apparent that one of ordinary skill in the art could utilize the present invention in various types of image processing systems. Furthermore, a variety of different types of image processing circuits can be utilized in place of the binarization in filter circuit 72 of the video section 12 in the presently described image processor.

We claim:

1. In an apparatus for processing video images from two separate sources wherein each video image is represented by two interlaced video fields, a system for storing the images comprising:
   a first means for converting one of the video images into a series of digital picture elements;
   a second means for converting the other video image into a series of digital picture elements;
   means for designating whether the series of picture elements for one or both of the fields of the video image from each source is to be stored;
   means for storing video images, said means having more than two sections with each section storing the series of picture elements for a video image field; and
   means for selectively coupling said first and second means for converting by two distinct signal paths to separate sections of said means for storing to enable picture elements for the fields of the two images to be simultaneously written into respective sections, and to enable picture elements from either of said first and second means for converting to be stored in any section of said means for storing.

2. The system for storing as recited in claim 1 wherein said means for selectively coupling is responsive to said means for designating, so that when both fields of a video image are designated, the picture elements for those fields are stored in different sections of said means for storing.

3. The system for storing as recited in claim 1 further comprising means for reading the stored picture elements of an image from the means for storing as other picture elements for the image are being stored.

4. The system for storing as recited in claim 3 further comprising means for controlling the access to said means for storing wherein the retrieval of the picture elements for one source's image from the means for storing is interrupted in order to store picture elements for the image from the other source.

5. The system for storing as recited in claim 3 further comprising means for designating the resolution of an image field to be read out of said means for storing; and wherein said means for reading reads out every Xth picture element from said means for storing, where X is a positive integer determined by the means for designating the resolution.

6. The apparatus recited in claim 1 further comprising a means for analyzing the picture elements of a video image and having an input to receive digital picture elements and means for selectively connecting the input to each of the sections of said means for storing video images.

7. In an apparatus for processing first and second video images from separate sources, a system for storing the images comprising:
   a first means for converting the first image into a series of digital picture elements;
   a second means for converting the second image into a series of digital picture elements;
   means, coupled to said first and second means for converting, for storing the series of picture elements for the two images;
   means for reading the picture elements from said means for storing;
   means for controlling the access to the means for storing by said means for reading to enable picture elements of the first image to be read out of the means for storing during a plurality of first time intervals interleaved with a plurality of second time intervals during which picture elements of the second image are written into the means for storing; and
   means, coupled to the means for controlling, for inhibiting the reading of picture elements for the first image during at least one of the first time intervals, in order to analyze a plurality of picture elements of the second image during the first time intervals.

8. The apparatus for processing video images as recited in claim 7 further comprising:
   means for measuring the luminance of the picture elements in a portion of the video images from the two sources; and
   means for adjusting the first and second means for converting in response to the means for measuring to compensate for temporal variations in the illumination of objects in the video images.

9. The apparatus for processing video images as recited in claim 8 wherein said means for inhibiting interrupts the reading of picture elements for the first image in order to enable said means for measuring and said means for adjusting to perform their functions with respect to the second image.

10. An apparatus for processing video images comprising:
   means for converting the video image into a series of digital picture elements;
   means for storing the series of digital picture elements for the video image;
   means for designating a position in the video image;
   a memory controller for reading picture elements from said means for storing; and
   means for analyzing picture elements read from said means for storing by said memory controller, the analyzing commencing after a picture element corresponding to the designated position in the image has been stored and before all of the picture elements of the video image to be analyzed have been stored.

11. The apparatus as recited in claim 10 wherein said means for analyzing includes means for measuring the luminance of a portion of the video image; and means for adjusting the processing of the image in response to the measured luminance.

12. The apparatus as recited in claim 10 further comprising means for compensating for temporal variations in the illumination of objects in the video image, including means for measuring the luminance of a portion of the video image and means for altering the means for converting in response to the measured luminance.

13. The apparatus as recited in claim 12 wherein said means for measuring commences measuring the luminance after all of the picture elements for the portion of the image have been stored and before all of the picture elements for the image have been stored.

14. The apparatus as recited in claim 13 wherein the means for altering alters the means for converting prior to all of the image being converted into picture elements.

15. An apparatus for processing video images comprising:

means for converting the video image into a series of digital picture elements;

means for storing the series of digital picture elements for the video image;

first means for defining in the image a first region containing picture elements to be analyzed;

second means for defining in the image a rectangular second region which encloses the first region and which contains other picture elements than just those to be analyzed, but less than all the picture elements of the video image; and means for reading all of the picture elements in the second region of the image from said means for storing, in response to said second means for defining.

16. The apparatus as recited in claim 15 further comprising means for analyzing the image elements read from said means for storing to evaluate a portion of the image represented by said elements.

17. The apparatus as recited in claim 15 further comprising means for determining whether a given picture element in the second region is also in the first region.

18. The apparatus as recited in claim 17 wherein said means for determining includes a means for storing a mask of the second region.

* * * * *